(12) United States Patent
Jones, IV et al.

(10) Patent No.: US 6,657,950 B1
(45) Date of Patent: Dec. 2, 2003

(54) OPTIMAL FILTERING AND UPCONVERSION IN OFDM SYSTEMS

(75) Inventors: Vincent K. Jones, IV, Redwood Shores, CA (US); James M. Gardner, San Jose, CA (US); Michael Pollack, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/253,152

(22) Filed: Feb. 19, 1999

(51) Int. Cl.[7] .................................................. H04J 11/00
(52) U.S. Cl. ........................ 370/208; 370/210; 375/260
(58) Field of Search ................................ 370/32.1, 203, 370/210, 208; 375/285, 14, 260, 229, 316–350; 235/156; 364/724.1

(56) References Cited

U.S. PATENT DOCUMENTS

| | | | | |
|---|---|---|---|---|
| 3,980,873 A | * | 9/1976 | Mattei | 235/156 |
| 5,166,924 A | * | 11/1992 | Moose | 370/32.1 |
| 5,317,596 A | * | 5/1994 | Ho | 375/14 |
| 5,535,246 A | * | 7/1996 | Beech | 375/285 |
| 5,657,261 A | * | 8/1997 | Wilson | 364/24.1 |
| 5,739,691 A | * | 4/1998 | Hoenninger, III | 324/322 |
| 6,175,551 B1 | * | 1/2001 | Awater et al. | 370/210 |
| 6,249,395 B1 | * | 6/2001 | Conway | 360/551 |

OTHER PUBLICATIONS

Bracewell, *The Fourier Transform and its Applications*, ($2^{nd}$ Ed. Revised 1986) at pp. 362–370.
Wu et al., "FIR Filter Design via Semidefinite Programming and Spectral Factorization", Stanford University.
Wu et al., "FIR Filter Design via Spectral Factorization and Convex Optimization", 1997, *Applied Computational Control, Signal and Communications*, Chap. 1.

* cited by examiner

*Primary Examiner*—Douglas Olms
*Assistant Examiner*—Robert W. Wilson
(74) *Attorney, Agent, or Firm*—Ritter, Lang & Kaplan LLP (57) ABSTRACT

Systems and methods for converting a baseband OFDM signal to an IF signal while minimizing lengthening of the impulse response duration experienced by the OFDM signal. A conversion technique according to the present invention provides sufficient filtering to limit the effects of spurious frequency domain components caused by transitions between successive OFDM bursts. In one embodiment, the filtering is provided by a combination of a finite impulse response (FIR) filter having non-linear phase characteristics and a cyclic convolution filter. Conversion from the frequency domain into the time domain, upsampling, and cyclic filtering may be combined into one operation.

18 Claims, 9 Drawing Sheets

OPTIMAL FILTERING AND UPCONVERSION IN OFDM SYSTEMS

BACKGROUND OF THE INVENTION

The present invention relates to digital communication systems and more particularly to systems for transmitting using Orthogonal Frequency Division Multiplexing (OFDM).

Modern digital communication systems typically incorporate a preliminary step of translating data to be transmitted into a series of so-called symbols. Each symbol can take on one of M possible complex values and therefore carries $\log_2 M$ bits of information. The symbols define modulation on a sinusoidal carrier with the real part of each symbol defining a in-phase component of the modulated carrier and the imaginary part of each symbol defining a quadrature (90 degrees shifted relative to in-phase) component of the modulated carrier.

The generation of symbols is a digital process whereas the ultimately transmitted signal is typically analog. In a wireless system, the ultimately transmitted signal is at the so-called "RF" or radio frequency. Since the radio frequency is often quite high rendering certain signal conditioning steps more difficult, it is common to first modulate a signal at a lower frequency called the "IF" or intermediate frequency and then convert this IF signal to the RF frequency.

One way to modulate the IF signal is to isolate the real and imaginary components of the symbols, multiply the real portion by a digital cosine waveform at the IF frequency and the imaginary portion by a sine waveform at the IF frequency. The resulting two scalar digital signals are then converted to analog and summed to produce the IF signal. This approach has been found to be impractical because even very tiny deviations from 90 degrees in the phase difference between the cosine and sine waves cause unacceptable crosstalk between the real and imaginary symbol components as captured at the receiver end.

A more robust modulation technique relies on a system design where the IF frequency is selected to be, e.g., greater than two times the baseband sampling frequency. An upsampler increases the sampling rate of the baseband symbol stream by a factor of L by interspersing L−1 zero values between each baseband symbol. This has the effect of replicating the baseband symbol stream spectrum in the frequency domain. An interpolation filter selects the baseband component in the frequency domain. This component is shifted to an IF frequency. In the time domain, the real part of the shifted signal is extracted. Conversion of this real part to analog produces the analog IF signal. Although interpolation filter design may be difficult, this is a commonly used solution.

There are, however, difficulties with this technique when it is applied to so-called "OFDM" communication systems. The abbreviation "OFDM" refers to Orthogonal Frequency Division Multiplexing, a highly useful technique for developing time domain symbols for transmission. In OFDM, the available bandwidth is effectively divided into a plurality of subchannels that are orthogonal in the frequency domain. During a given symbol period, the transmitter transmits a symbol in each subchannel. To create the baseband time domain signal corresponding to all of the subchannels, an IFFT is applied to a series of frequency domain symbols to be simultaneously transmitted, a "burst." The resulting series of time domain symbols is augmented with a cyclic prefix prior to transmission. The cyclic prefix addition process can be characterized by the expression:

$$[z(1) \ldots z(N)]^T \mapsto [z(N-v+1) \ldots z(N) z(1) \ldots z(N)]^T$$

OFDM provides particularly good performance in systems subject to multipath effects where different copies of the same symbol may be received at different times due to their travel by differing length paths. Because OFDM greatly increases the length of the symbol period, these multipath effects are experienced as self-cancellation or reinforcement of the same symbol rather than intersymbol interference.

The cyclic prefix has length v where v is greater than or equal to a duration of the impulse response of the overall channel and assures orthogonality of the frequency domain subchannels. The overall channel, however includes any filtering used in the modulation and upconversion process and thus includes the interpolation filter. To effectively select only the baseband frequency domain component of the upsampled time domain signal typically requires an FIR with many taps or an IIR, either of which will greatly increase the time duration of the channel impulse response. The increased duration of the channel impulse response requires a longer cyclic prefix which reduces data carrying efficiency.

The filtering operations required in OFDM systems are even more challenging because individual OFDM bursts follow one another in succession in the time domain. The abrupt transitions between bursts give rise to spurious components that lie outside the defined frequency domain subchannels. These components should be greatly attenuated 1) to prevent the resampling processes from creating further spurious artifacts within the frequency domain signal and 2) to prevent out-of-band spurious emissions that exceed government requirements.

What is needed are systems and methods for accurately converting a baseband OFDM signal to an IF signal without substantially lengthening of the channel impulse response duration experienced by the OFDM signal while sufficiently attenuating spurious out-of-band artifacts.

SUMMARY OF THE INVENTION

Systems and methods for converting a baseband OFDM signal to an IF signal while minimizing lengthening of the impulse response duration experienced by the OFDM signal are provided by virtue of the present invention. A conversion technique according to the present invention provides sufficient filtering to limit the effects of spurious frequency domain components caused by transitions between successive OFDM bursts. In one embodiment, the filtering is provided by a combination of a finite impulse response (FIR) filter having non-linear phase characteristics and a cyclic convolution filter. Conversion from the frequency domain into the time domain, upsampling, and cyclic filtering may be combined into one operation.

In accordance with a first aspect of the present invention, apparatus for transmitting OFDM signals includes: a transform processor that transforms a frequency domain burst of symbols into a time domain burst of symbols, and a signal processing system that receives the time domain burst of symbols and performs operations on the time domain burst of symbols to develop a filtered time domain burst of symbols. The signal processing system includes an FIR filter having non-linear phase characteristics.

In accordance with a second aspect of the present invention, apparatus for transmitting OFDM signals includes: a transform processor that transforms a frequency domain burst of symbols into a time domain burst of symbols, and a signal processing system that receives the time domain burst of symbols and performs operations on the time domain burst of symbols. The signal processing system includes a cyclic convolutional filter that provides a filtered time domain symbol burst as output.

In accordance with a third aspect of the present invention, apparatus for transmitting OFDM signals includes: a transform processor that transforms a series of frequency domain symbol bursts into time domain symbol bursts; and a filtering system that digitally filters the time domain symbol bursts to ameliorate spectral artifacts caused by interburst boundaries while minimizing delay spread induced by the filtering system.

A further understanding of the nature and advantages of the inventions herein may be realized by reference to the remaining portions of the specification and the attached drawings.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

Figure 1:
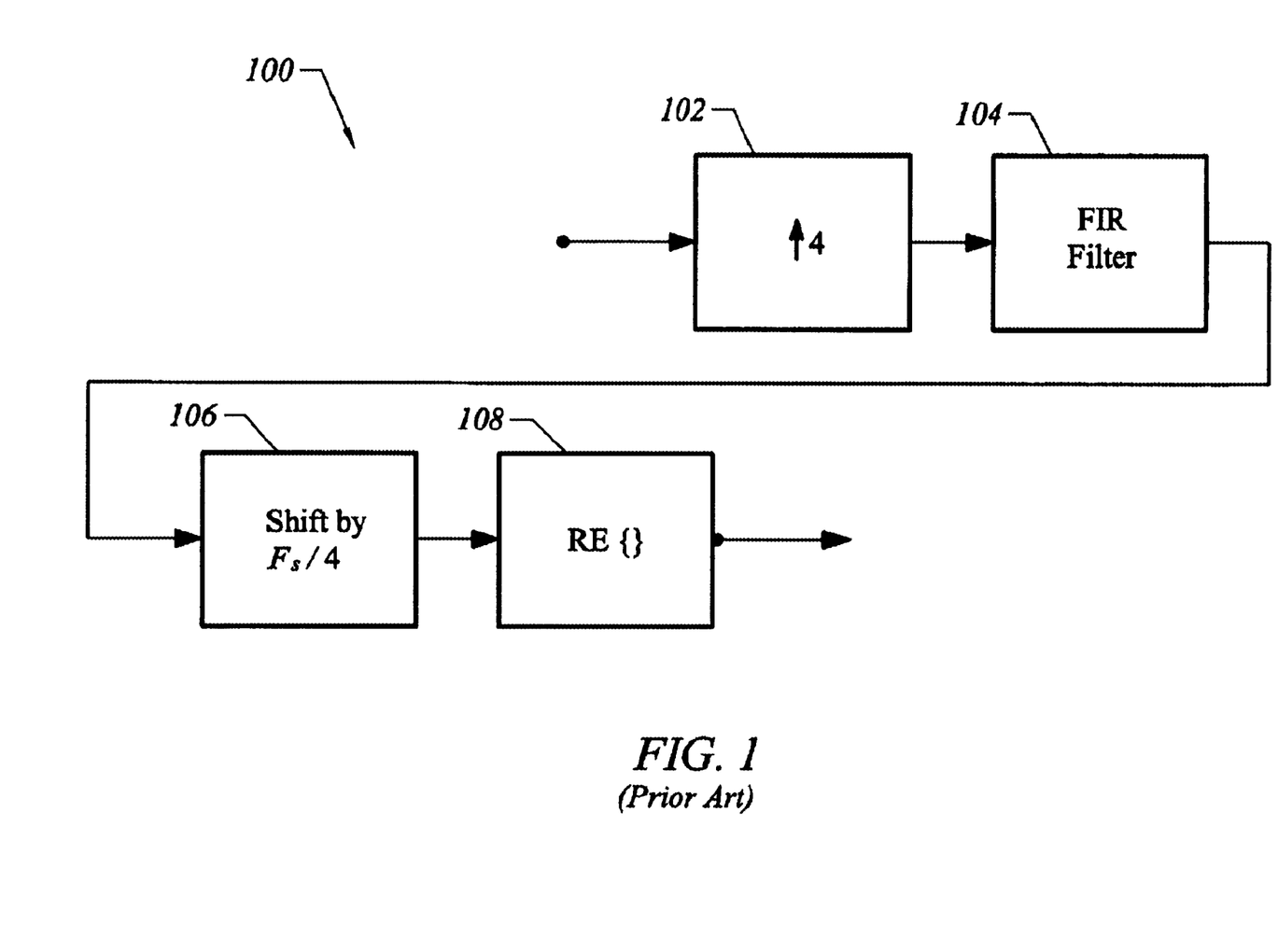
FIG. 1 depicts an upconversion and filtering system according to the prior art.
Figure 2A:
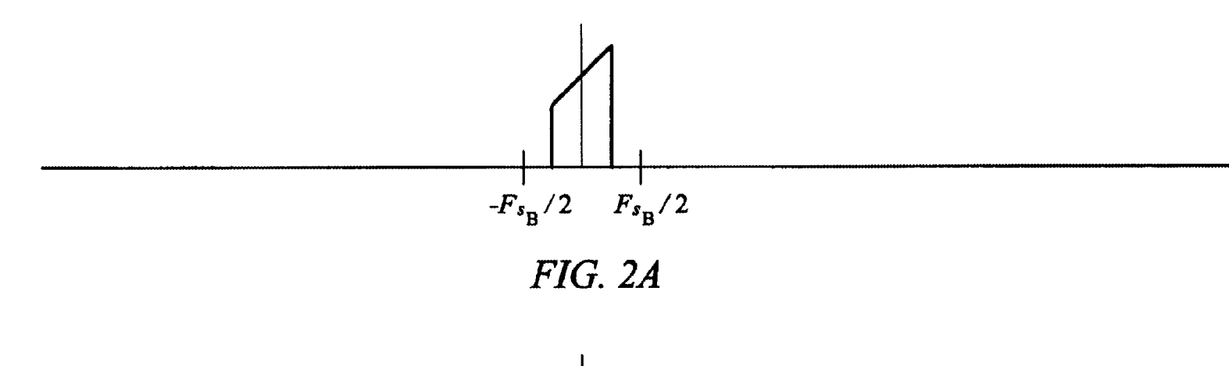
FIGS. 2A–2E depict frequency domain spectra at various stages of the upconversion and filtering system of FIG. 1.

FIG. 1 depicts an upconversion and filtering system 100 according to the prior art. The input to upconversion and filtering system 100 is a stream of baseband symbols. The baseband symbols are provided at a baseband sampling rate, $f_{S_B}$. Each symbol is one of M complex values. The exact complex values used and the number M are parameters of the modulation scheme used. For example, for 16-QAM, the complex values would be represented as an array of 16 points on the complex plane. For 8-PSK, the complex values would be represented as 8 points on the complex plane, all lying on a circle around the origin. A representative frequency domain magnitude spectrum of the input to upconversion and filtering system 100 is shown in FIG. 2A.

Figure 2B:
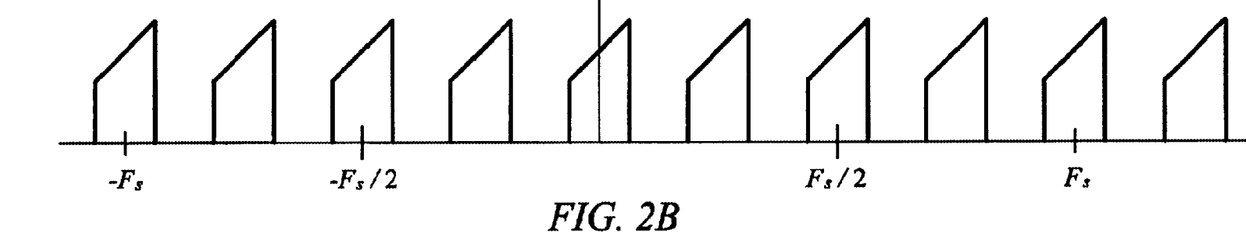

An upsampler 102 intersperses three zeroes between each baseband symbol to increase the sampling rate by a factor of four to a new sampling frequency $f_S$. FIG. 2B depicts the frequency domain magnitude spectrum output of upsampler 102. As can be seen, the upsampling process inherently creates numerous images. These are filtered away by an FIR filter 104 resulting in the spectrum of FIG. 2C. A frequency shifter 106 then shifts the spectrum to be centered at $f_S/4$ as shown in FIG. 2D by multiplying by the appropriate complex exponential. A real part extractor 108 obtains the real part of each time domain symbol output by frequency shifter 106. The spectrum of the real part is shown in FIG. 2E. The output of real part extractor 108 is then ready for conversion to an analog signal by a single digital to analog converter clocked at $f_S$. The IF frequency is then $f_S/4$.

The system depicted in FIG. 1 is not well suited for use in communication systems that employ OFDM. In OFDM, successive bursts of frequency domain symbols are converted to the time domain. A cyclic prefix is then appended to each time domain burst. The purpose of the cyclic prefix is to assure that frequency domain symbols are communicated in orthogonal subchannels. The cyclic prefix should be at least as long as the duration of the impulse response of the communication channel to the receiver end of the link. The communication channel includes, however, not only the transmission medium, e.g., free space, but also transmitter components between the generation of the time domain symbols and the antenna.

The communication channel thus also includes the FIR. In order to sufficiently attenuate the images of FIG. 2B while faithfully reproducing the baseband signal, the FIR will typically have a long impulse response. This impulse response will be added to the impulse response of the transmission medium and other transmitter components, thus lengthening the needed cyclic prefix. Since the time occupied by the cyclic prefix is not available for transmission of new data, system efficiency is reduced. Furthermore, the sharp transitions between successive OFDM bursts cause spurious emissions which increase the attenuation requirements on the FIR, further lengthening the impulse response.

According to the present invention, adequate filtering may be achieved with much less lengthening of impulse response duration than provided by the system of FIG. 1. In one embodiment, this is achieved by substituting a so-called "asymmetric" FIR filter for the conventional FIR filter of FIG. 1. Unlike a conventional "symmetric" filter, an asymmetric FIR filter has non-linear phase characteristics but minimizes impulse response duration. In an alternative embodiment, additional filtering is provided by a cyclic convolution filter which provided filtering with no increase in impulse response duration.

Figure 3:
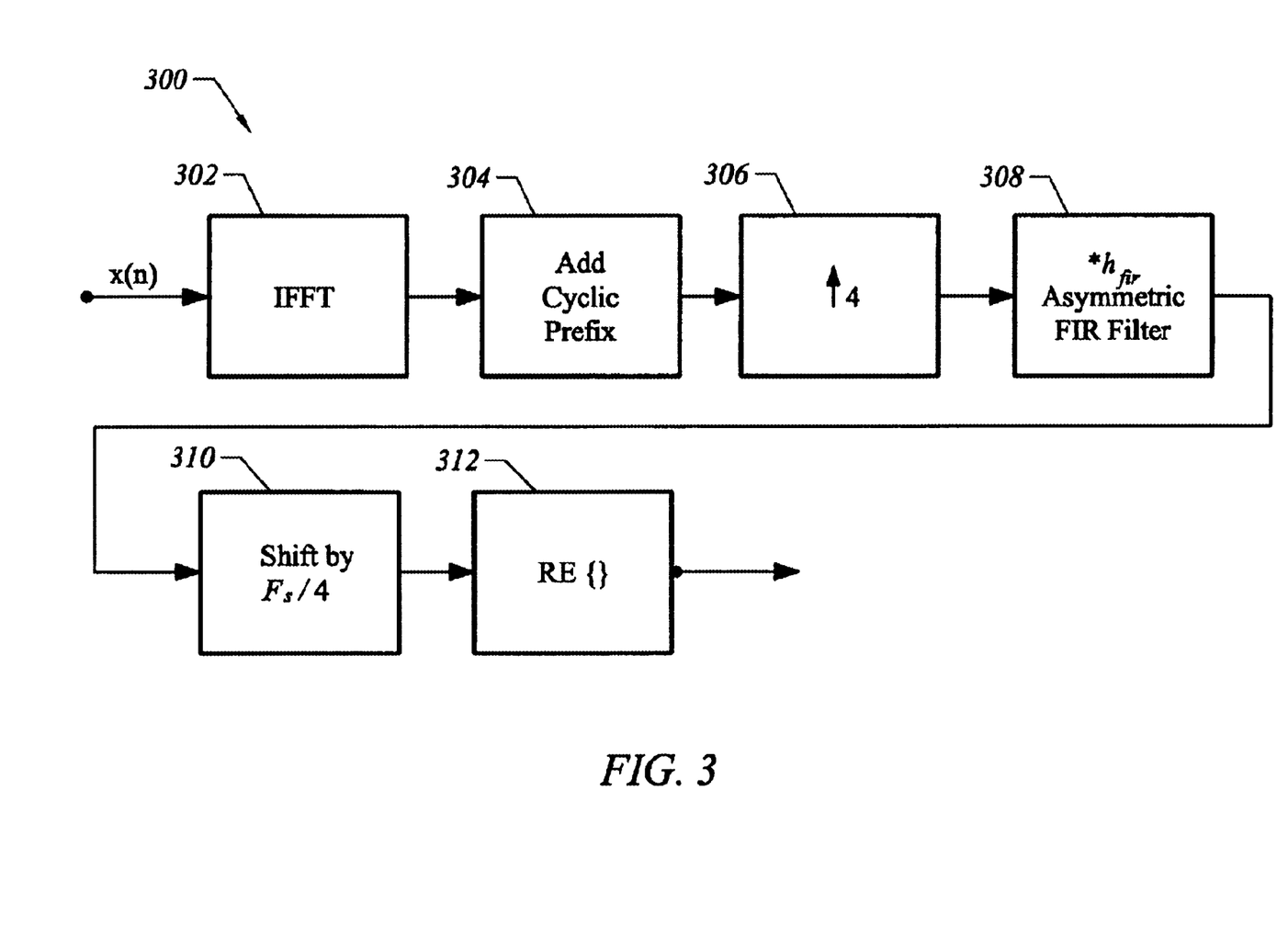
FIG. 3 depicts an upconversion and filtering system for use with OFDM according to the present invention.

FIG. 3 depicts an upconversion and filtering system 300 for use with OFDM according to the present invention. Successive bursts of frequency domain symbols are input to an IFFT processing block 302. IFFT processing block 302 applies the inverse Fast Fourier Transform to obtain successive bursts of symbols in the time domain. A cyclic prefix addition block 304 adds the cyclic prefix. The spectrum output of cyclic prefix addition block 304 is similar to that of FIG. 2A.

An upsampler 306 intersperses three zeroes between each baseband symbol to increase the sampling rate by a factor of four to a new sampling frequency $f_S$. The spectrum output of upsampler 306 is similar to what is depicted in FIG. 2B. The output of upsampler 306 is the input to an FIR filter 308 having special characteristics.

FIR filter 308 is an asymmetric filter. Unlike conventional FIR filters, the phase component of the frequency response of FIR filter 308 is not linear over frequency. By relaxing the requirement of linear phase across frequency, one can find filter designs with much shorter impulse response durations than would be possible with linear phase (symmetric) FIR filters. For symmetric filters, the impulse response values are symmetric around a center point of the overall impulse response duration. This assures constant group delay through the filter which is generally a requirement for QAM systems to allow for equalization to remove channel distortion. Constant group delay is, however, not a requirement for OFDM systems. Optimal FIR filter design techniques that are applicable to asymmetric filters are described in Boyd, et al., *FIR Filter Design via Semidefinite Programming and Spectral Factorization*, the contents of which are herein incorporated by reference.

Figure 2C:
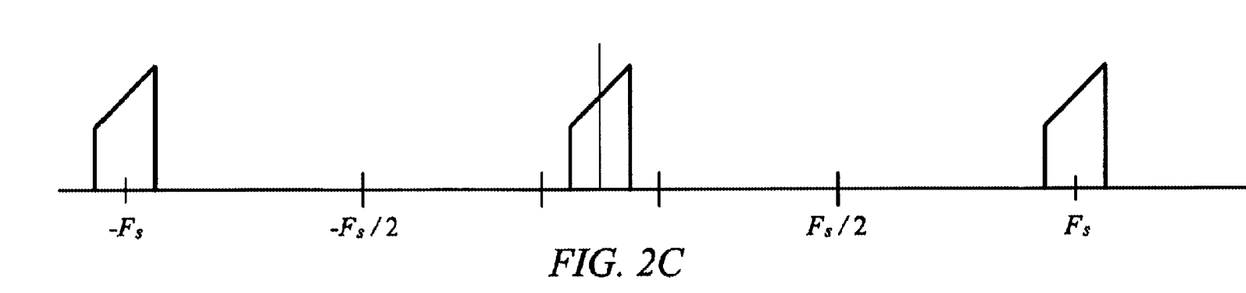
Figure 2D:
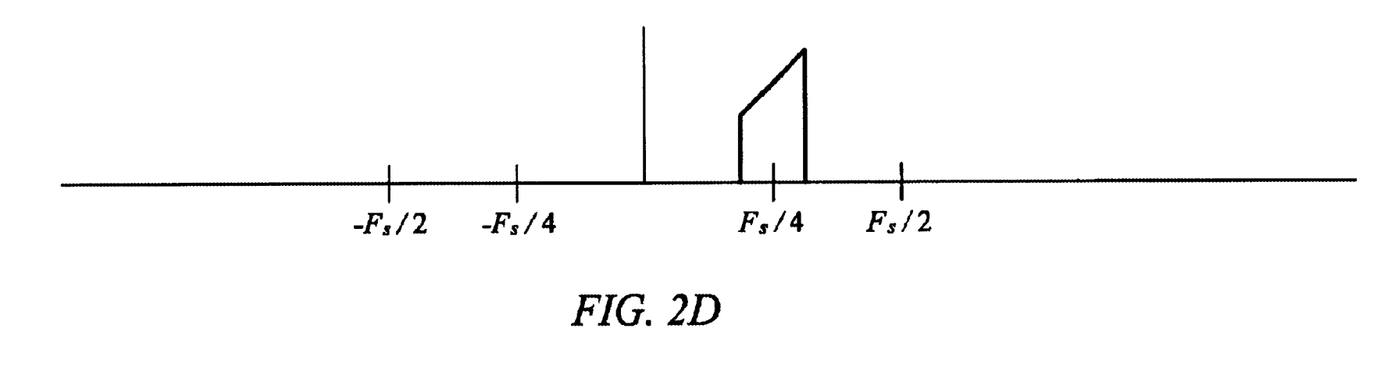
Figure 2E:
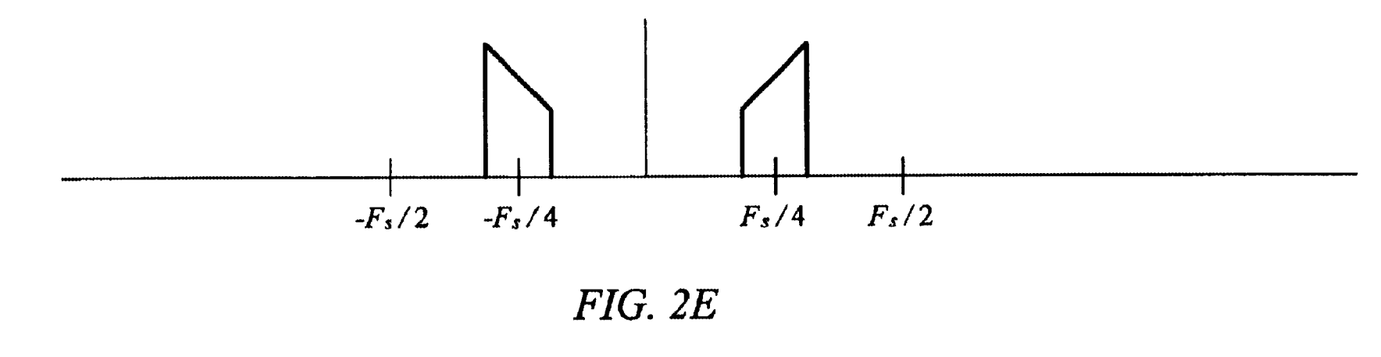

The output spectrum of FIR filter 308 is similar to what is depicted in FIG. 2C. A frequency shifter 310 then shifts the spectrum to be centered at $f_S/4$ as shown in FIG. 2D by multiplying by the appropriate complex exponential. A real part extractor 312 obtains the real part of each time domain symbol output by frequency shifter 106. The spectrum of the real part is then as shown in FIG. 2E. It should be noted that the spectra shown in FIGS. 2A–2E do not faithfully reproduce an actual OFDM spectrum but are instead employed to show the operation of the various components.

Figure 4:
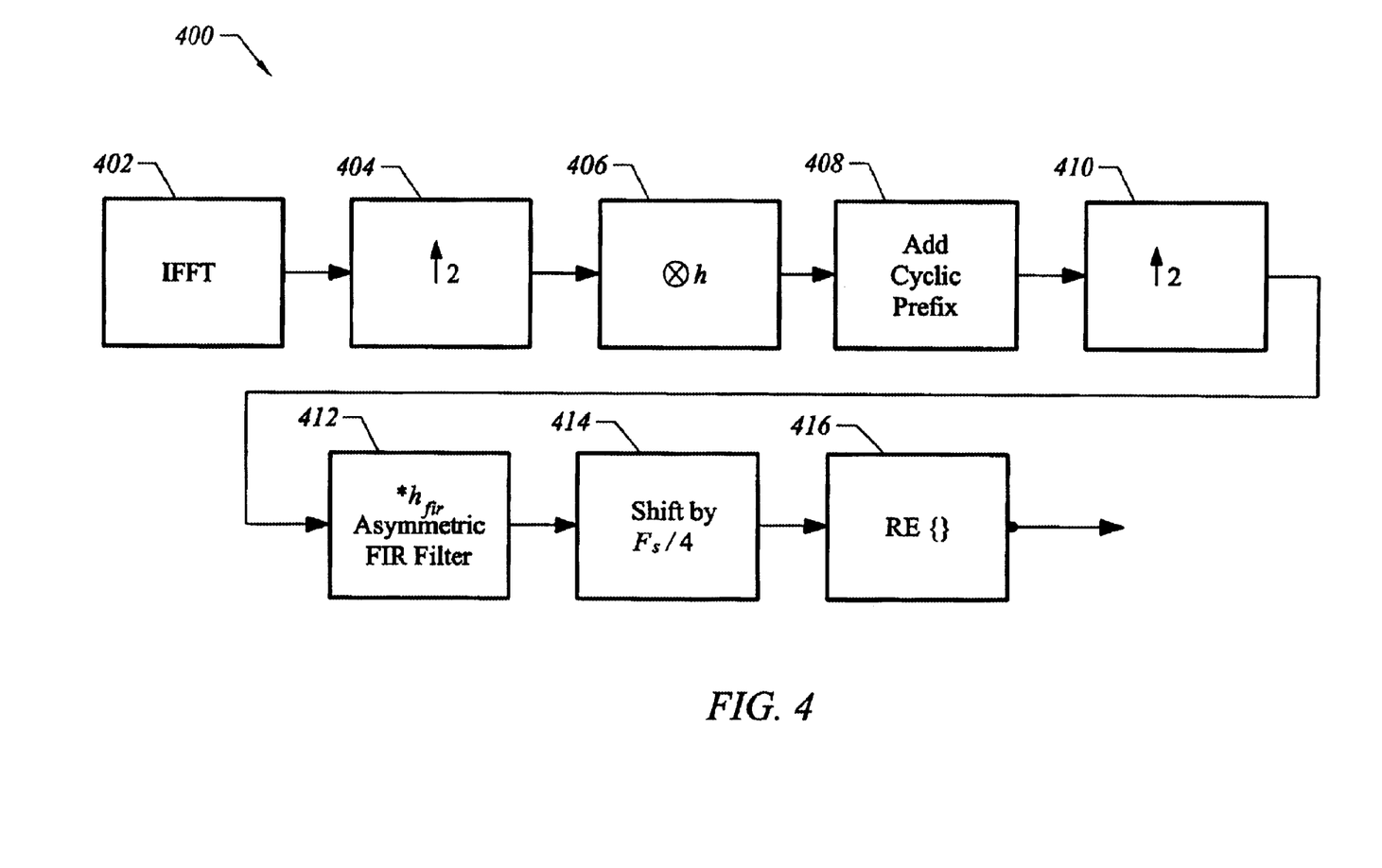
FIG. 4 depicts an alternative upconversion and filtering system for use with OFDM according to the present invention.
Figure 5A:
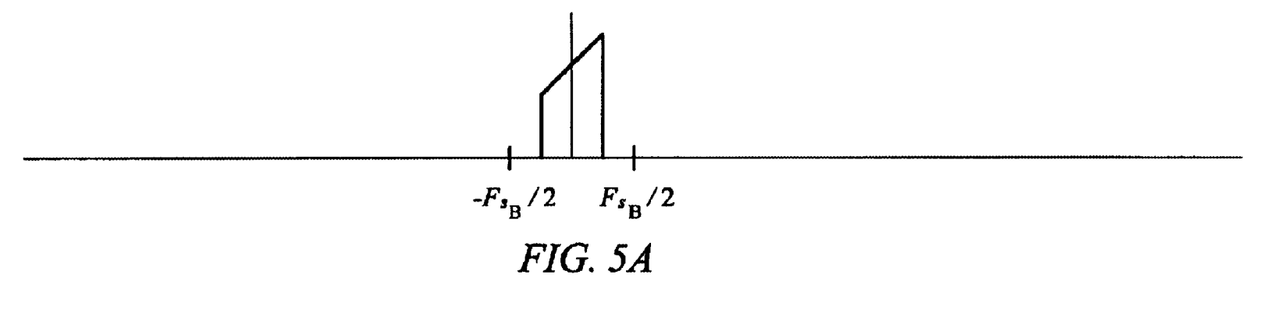
FIGS. 5A–5G depict frequency domain spectra at various stages of the upconversion and filtering system of FIG. 4.
Figure 5B:
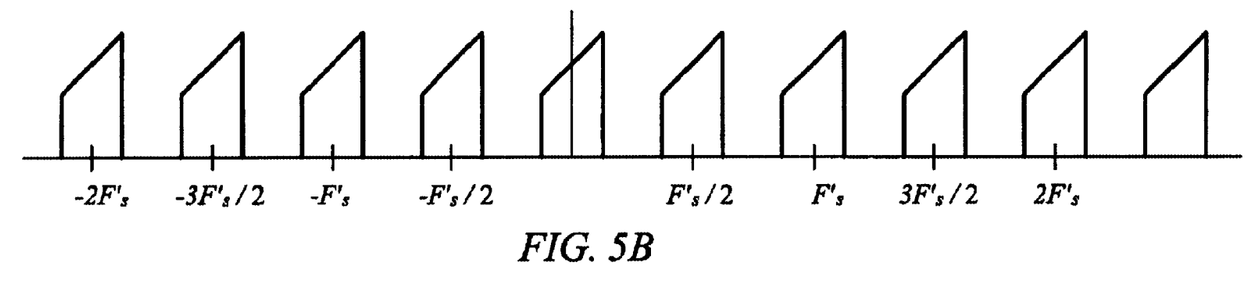

FIG. 4 depicts an alternative upconversion and filtering system 400 for use with OFDM according to the present invention. Upconversion and filtering system 400 employs cyclic filtering in combination with an asymmetric FIR. An IFFT processing block 402 converts bursts of frequency domain symbols to bursts of time domain symbols resulting in the frequency domain magnitude spectrum of FIG. 5A. An upsampler 404 intersperses one zero between each baseband symbol to increase the sampling rate by a factor of two to a new sampling frequency $f_{S'}$. FIG. 5B depicts the output spectrum of upsampler 404.

Figure 5C:
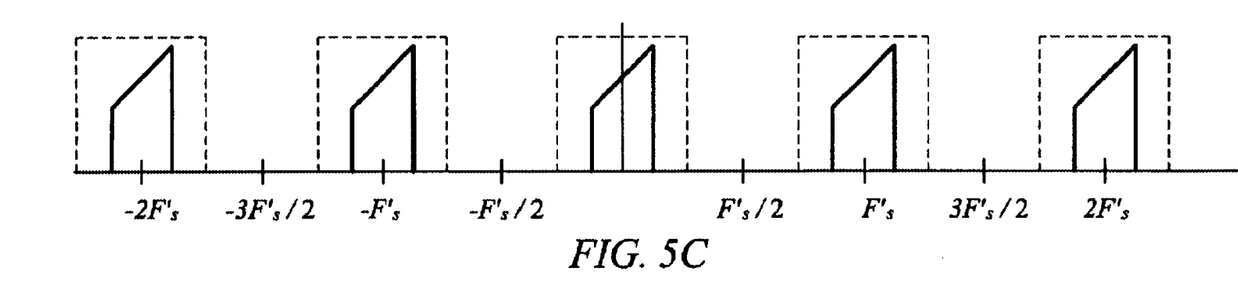

A cyclic filter 406 then removes alternating images from the spectrum of FIG. 5B resulting in the spectrum of FIG. 5C. A cyclic filter is defined in terms of a so-called cyclic convolution with the filter impulse response. Cyclic convolution is described in Bracewell, *The Fourier Transform and its Applications*, ($2^{nd}$ Ed. Revised 1986) at pp. 362–370, the contents of which are herein incorporated by reference. The cyclic convolution of two discrete time time domain sequences with N elements, x(t) and y(t), is defined to be:

$$x(t) \otimes y(t) = \sum_{t'=0}^{N-1} f(t')g[t - t' + NH(t' - t)]$$

where H(t'−t) is the unit step function. The convolution of two N point sequences is another N point sequence. Thus, processing through a cyclic filter does not increase the duration of the time domain impulse response. Another useful property to note is that:

$$x(t) \otimes y(t) = \mathit{ifft}[\mathit{fft}(x(t)) * \mathit{fft}(y(t))]$$

The desired magnitude frequency response of cyclic filter 406 is shown in dotted line in FIG. 5C. This response has a very simple representation in the frequency domain. According to the present invention, one may incorporate the functionality of upsampler 404 and cyclic filter 406 into IFFT processing block 402. The N-point frequency domain sequence input to IFFT processing block 402 is zero-padded to become a 2N point frequency domain sequence with N/2 zeroes being placed before and after the original N-point sequence. IFFT processing block 402 then performs a 2N point IFFT rather than an N point IFFT. The patterns of zeroes in the frequency domain input to the 2N point IFFT matches the desired areas of attenuation for cyclic filter 406. The IFFT processing thus incorporates production of images as would occur in interpolation combined with ideal low pass filter attenuation of alternating out of band images.

Figure 5D:
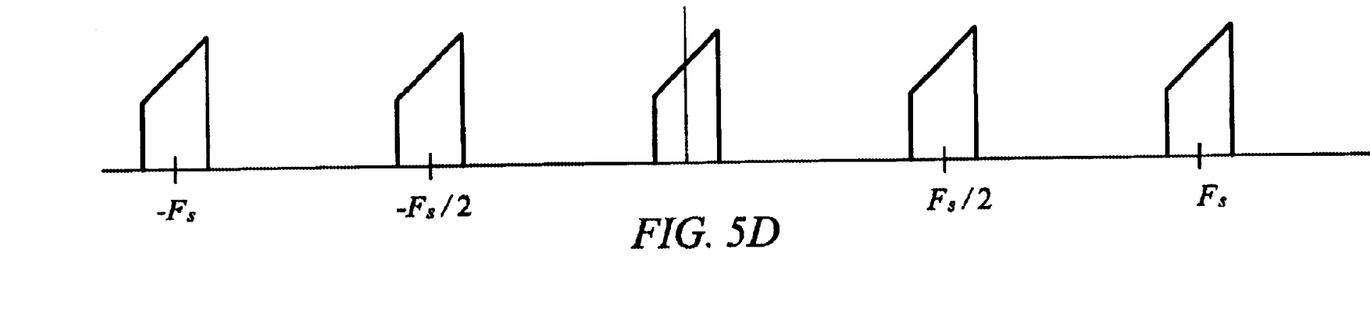

A cyclic prefix addition block 408 adds the cyclic prefix to the time domain bursts output by cyclic filter 406. The cyclic prefix addition process can occur here because up until now there has been no lengthening of the channel impulse response duration. A supplementary upsampler 410 inserts a zero after each time domain sample output by cyclic prefix addition block 410 to upsample to a new sampling frequency, $f_S$. This results in the spectrum of FIG. 5D.

Figure 5E:
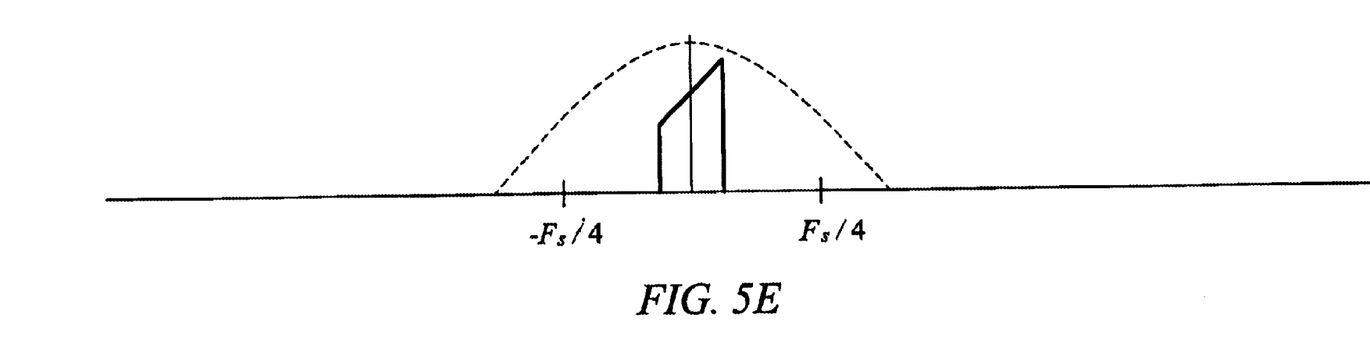

Now, the images caused by interpolation are far away from the baseband image, allowing use of an FIR filter with fewer taps than the one used in the system of FIG. 3. To minimize addition of impulse response duration to the channel, an asymmetric FIR filter 412 is used to filter away the sampling images resulting in the spectrum of FIG. 5E. The asymmetric FIR's task is made easier by the filtering already done by cyclic filter 406.

Figure 5F:
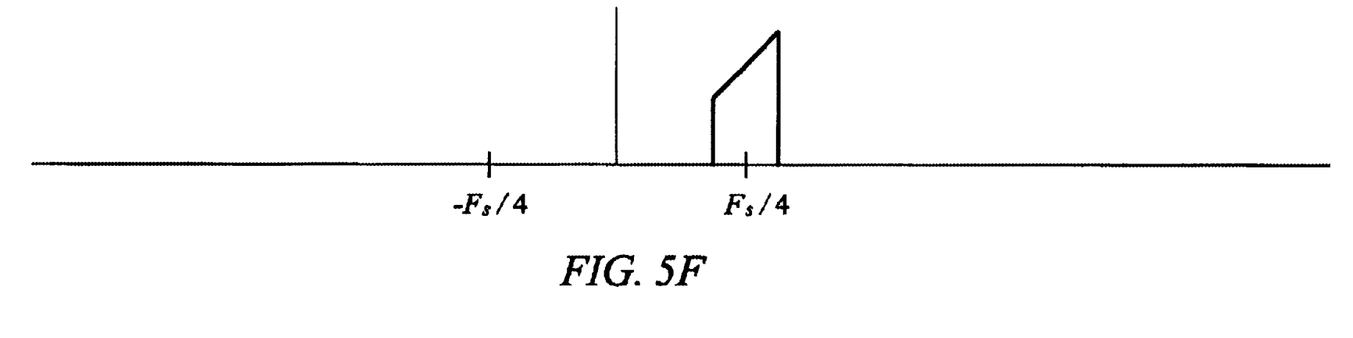
Figure 5G:
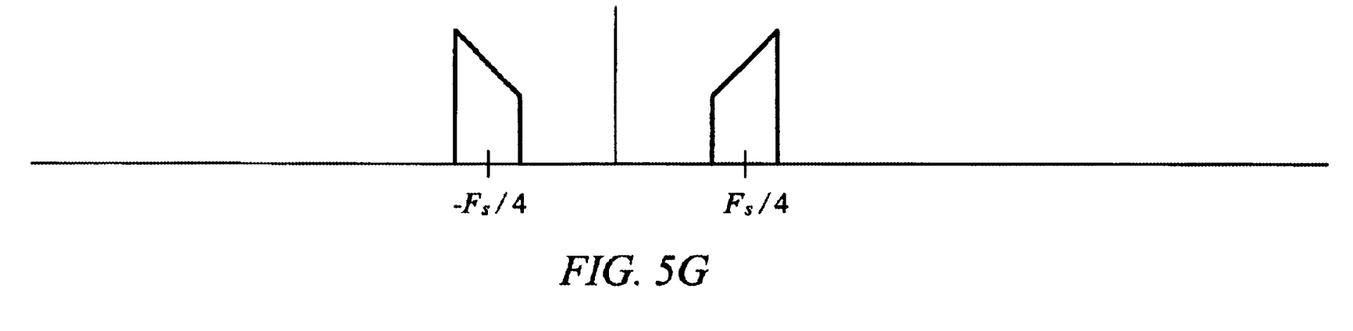

A frequency shifter 414 then shifts the spectrum to be centered at $f_S/4$ as shown in FIG. 5F by multiplying by the appropriate complex exponential. A real part extractor 416 obtains the real part of each time domain symbol output by frequency shifter 414. The resulting spectrum is shown in FIG. 5G and is ready for D/A conversion to an IF analog signal.

In one embodiment of the system of FIG. 4, the baseband sampling frequency, $f_{S_B}$, is 12 MHz, $f_{S'}$ is 24 MHz, and $f_S$ is 48 MHz. IFFT processing block 402 incorporates the functionality of upsampler 404 and cyclic filter 406 and performs a 1024 point IFFT where the center 512 points of the IFFT input are complex frequency domain symbols and the outer 512 points are zeroes.

Figure 6:
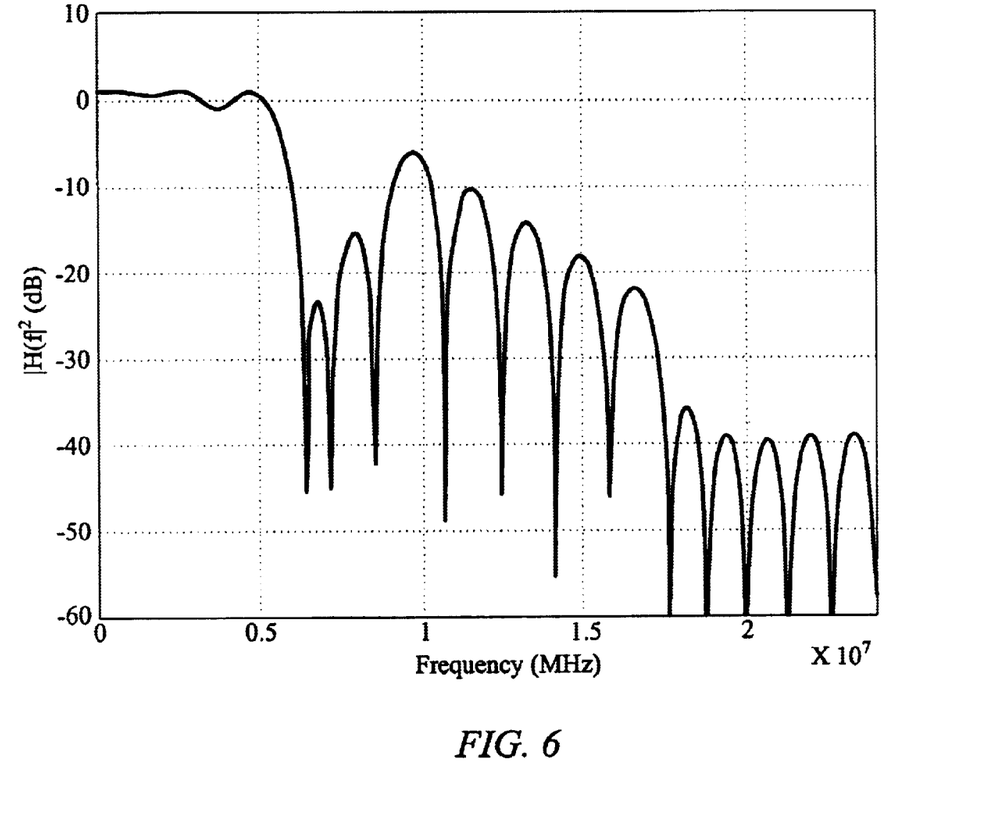
FIG. 6 depicts the frequency domain response of a finite impulse response filter having nonlinear phase characteristics according to one embodiment of the present invention.

FIG. 6 depicts the magnitude and phase components of asymmetric FIR filter 412 for this system. As can be seen, within a passband where it is desirable to pass signal unattenuated, the maximum attenuation is limited to ±1 dB. In the stop-band, where it is desirable to attenuate signal, the minimum attenuation is 8 dB. This example of FIR filter 412 may be implemented with 32 taps. The tap values used are included within an Appendix quantized to 12 bits. By contrast, if one would design a filter having linear phase characteristics, as many as 100 taps would be required.

While the above is a complete description of preferred embodiments of the invention, there is alternatives, modifications, and equivalents may be used. It should be evident that the invention is equally applicable by making appropriate modifications to the embodiments described above. For example, wherever the term IFFT is used, it should be understood that an FFT operation may be substituted for an IFFT. Also, wherever there is an upsampling process being described as being upsampling by some factor L, any value may be substituted for L. Therefore, the above description should not be taken as limiting the scope of the invention that is defined by the meets and bounds of the appended claims along with their full scope of equivalents.

What is claimed is:

1. Apparatus for transmitting OFDM signals comprising:
    a transform processor that transforms a frequency domain burst of symbols into a time domain burst of symbols; and
    a signal processing system that receives said time domain burst of symbols and performs operations on said time domain burst of symbols to develop a filtered time domain burst of symbols, said signal processing system comprising an FIR filter having non-linear phase characteristics, said signal processing system comprising a shifter that frequency shifts an output of said FIR filter to a desired IF.

2. The apparatus of claim 1 further comprising:
    a cyclic prefix block that adds a cyclic prefix to said time domain burst of symbols to lengthen said time domain burst.

3. The apparatus of claim 1 wherein said signal processing system comprises:

an upsampler that intersperses L−1 zero symbols between each symbol of said time domain burst and provides an upsampled time domain burst to said FIR filter.

4. The apparatus of claim 1 wherein said signal processing system comprises:

a first upsampler that increases a sampling rate of said time domain burst and provides a first upsampled time domain burst as output;

a cyclic convolution filter that receives said first upsampled time domain burst and provides a first filtered time domain burst as output; and a second upsampler that further increases a sampling rate of said first filtered time domain burst and provides a second upsampled time domain burst as output.

5. The apparatus of claim 4 wherein said signal processing system further comprises:

a cyclic prefix addition block that adds a cyclic prefix to said first filtered time domain burst.

6. The apparatus of claim 4 wherein said FIR filter receives said second upsampled time domain burst and provides a second filtered time domain burst as output.

7. The apparatus of claim 1 wherein said frequency domain burst of symbols input to said IFFT processor has N symbols and is zero-padded to M*N symbols prior to obtaining said time domain burst, said time domain burst having M*N samples.

8. The apparatus of claim 7 further comprising:

an upsampler that increase a sampling rate of said time domain burst and provides an upsampled time domain burst as input to said FIR filter having non-linear phase characteristics.

9. Apparatus for transmitting OFDM signals comprising:

a transform processor that transforms a frequency domain burst of symbols into a time domain burst of symbols; and a signal processing system that receives said time domain burst of symbols and performs operations on said time domain burst of symbols, said signal processing system comprising:

a cyclic convolution filter that provides a filtered time domain symbol burst as output; and a first upsampler that receives said time domain burst of symbols and provides a first upsampled time domain burst as input to said cyclic convolution filter.

10. The apparatus of claim 9 wherein said frequency domain burst of symbols input to said IFFT processor has N symbols and is zero-padded to M*N symbols prior to obtaining said time domain burst, said time domain burst having M*N samples.

11. The apparatus of claim 10 wherein said signal processing system further comprises:

a cyclic prefix addition block that adds a cyclic prefix to said time domain burst.

12. The apparatus of claim 9 wherein said signal processing system further comprises:

an FIR filter having non-linear phase characteristics that filters said upsampled time domain burst.

13. The apparatus of claim 9 wherein said signal processing system further comprises:

a second upsampler that receives said filtered time domain burst as input and provides a second upsampled time domain burst as output.

14. The apparatus of claim 9 wherein said signal processing system further comprises:

an FIR filter having non-linear phase characteristics that filters said upsampled time domain symbol burst.

15. A method for transmitting OFDM signals comprising:

receiving an N-symbol frequency domain symbol burst;

zero-padding said N-symbol frequency domain symbol burst to form an M*N-symbol frequency domain burst; and transforming said M*N-symbol frequency domain symbol burst into an M*N-symbol time domain burst, wherein operations of upsampling, cyclic filtering, and conversion from the frequency domain to the time domain are accomplished by said transforming.

16. The method of claim 15 wherein M=2.

17. The method of claim 16 further comprising upsampling said M*N-symbol time domain burst to form a 4*N symbol time domain burst.

18. The method of claim 17 further comprising filtering said 4*N symbol time domain burst using an FIR filter having non-linear phase characteristics.

\* \* \* \* \*